United States Patent [19]

Tidwell

[11] Patent Number: 4,854,412

[45] Date of Patent: Aug. 8, 1989

[54] FORK STABILIZER FOR MOTORCYCLE

[76] Inventor: Kelly Tidwell, 5842 McFadden, Suite 0, Huntington Beach, Calif. 92647

[21] Appl. No.: 163,267

[22] Filed: Mar. 2, 1988

Related U.S. Application Data

[63] Continuation-in-part of Ser. No. 58,170, Jun. 4, 1987, Pat. No. 4,742,885.

[51] Int. Cl.[4] .............................................. B62K 99/24
[52] U.S. Cl. .................................. 180/219; 280/276; 280/279
[58] Field of Search ................ 180/219; 280/274, 275, 280/277, 279, 280, 281 R

[56] References Cited

U.S. PATENT DOCUMENTS

| | | | |
|---|---|---|---|
| 4,479,661 | 10/1984 | Weigl | 280/279 |
| 4,512,592 | 4/1985 | Yoshioka | 280/279 |
| 4,705,285 | 11/1987 | Yoshida | 280/279 |
| 4,742,885 | 5/1988 | Tidwell | 280/279 |

Primary Examiner—Charles A. Marmor
Assistant Examiner—Donn McGiehan

[57] ABSTRACT

A fork stabilizer for the front-end fork of a motorcycle is provided. The fork stabilizer includes an elongate member, comprised of unitary metallic material having a substantially solid cross-sectional area, the elongate member also having transverse curved areas disposed at each end of the elongate member, said curved areas being closely machined to make a net fit between the prongs of the front-end fork of the motorcycle, having bolt holes disposed at each corner thereof, said bolt holes having an expanded region adapted to receive the heads of said bolts and also having a restricted region adapted to retain the elongate portion of said bolts whereby the twisting forces are substantially reduced, thereby assuring smooth and continuous operation and steering of said front-end fork.

10 Claims, 5 Drawing Sheets

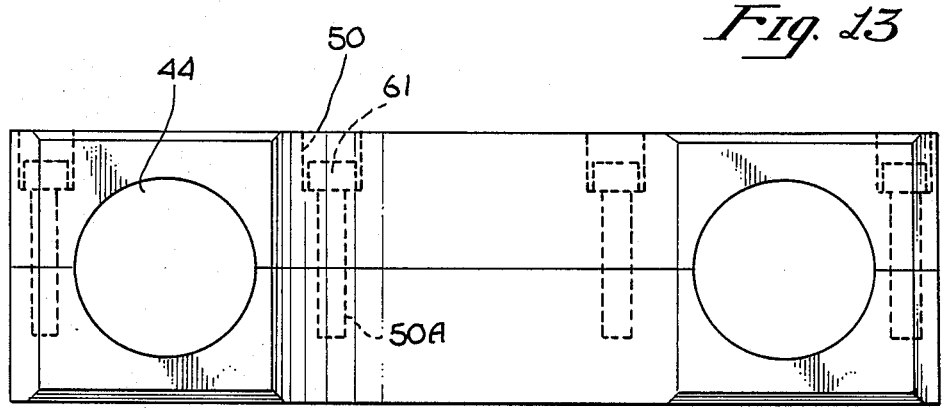
Fig. 13
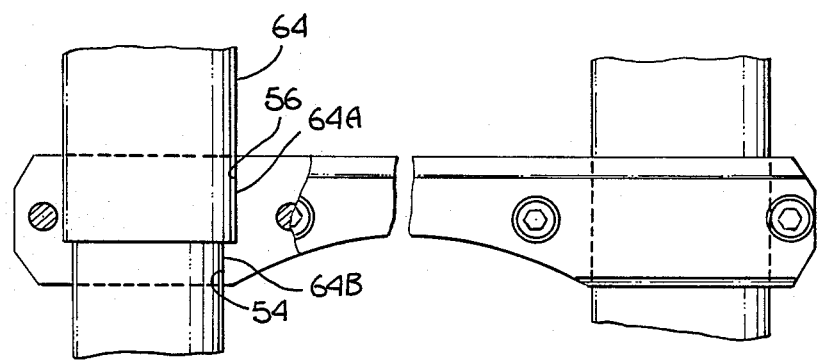
Fig. 14
Fig. 14A
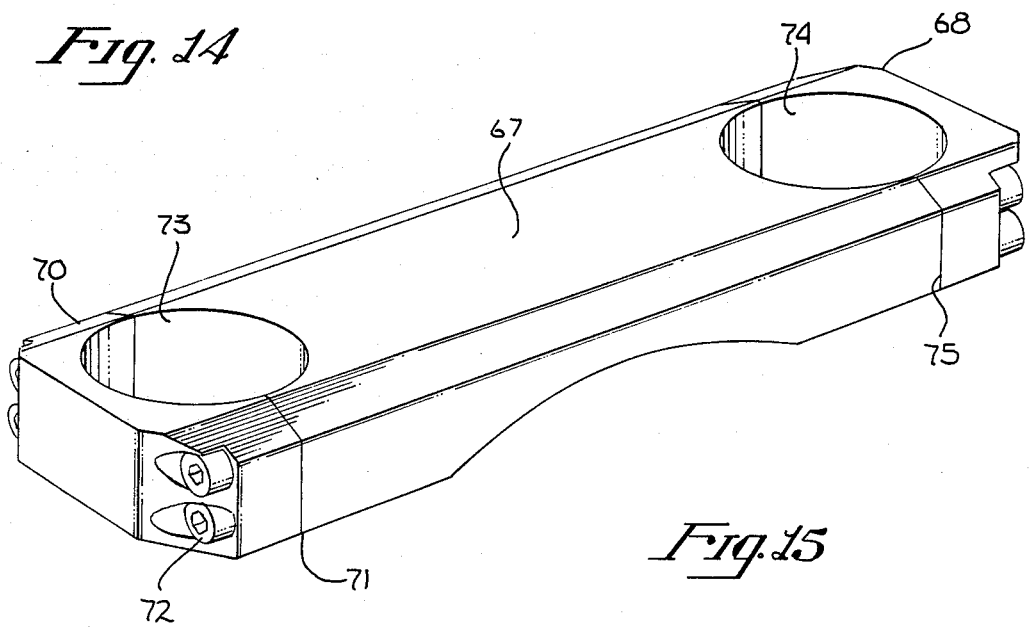
Fig. 15

FORK STABILIZER FOR MOTORCYCLE

This is a continuation-in-part application of U.S. patent application Ser. No. 07/058,170, filed June 4, 1987, now U.S. Pat. No. 4,742,885.

FIELD OF THE INVENTION

The present invention relates to fork stabilizers and, more particularly, to fork stabilizers for motorcycles.

BACKGROUND OF THE INVENTION

Over the years, motorcycles have increasingly gained in popularity. This is especially true with respect to large touring bikes. Correspondingly, improvements in motorcycle technology relating to improving handling and stability of the motorcycle during its ride has been direly sought.

A critical component of stability in operation of the motorcycle is the front-end assembly comprising a two-pronged fork having two rods which telescopically fit within, respectively, a pair of bottom case prongs, which is attached to the front wheel and which is also connected to the steering mechanism of the motorcycle.

Specifically, it has been discovered by the present inventor that problems are encountered with the bottom case prongs of the front end of motorcycles during turning and braking, as these conditions present unbalanced loads on the front fork assembly, causing the same to twist and deflect, allowing the front wheel to take positions and angles other than as commanded by the handlebar position. The resulting wheel motion or softness in the steering can lead to results ranging from an annoyance to total loss of control of the vehicle.

In the case of braking, the recent large touring motorcycles have disc brakes on both the left and right sides of the front wheel. However, these motorcycles also have what is referred to as integrated braking, whereby actuation of the "rear" brake control results in simultaneous actuation of the brake mechanisms at the right side of the rear wheel and at the left of the front wheel (rather than both sides of the front wheel). Thus, all of the braking torque for the front wheel must be absorbed by one side of the fork assembly only. Older cycles only have a brake mechanism on one side of the front, so that front braking is always unbalanced. Since the braking torque is a torque tending to rotate that side of the fork assembly rearwardly, the resulting deflection of the fork assembly will result in the front wheel turning to the left, a condition which, depending upon speed and braking rate, must be quickly compensated for. Further of course, the compensation must be proper in the sense that over compensation can lead to aggravation of the problem rather than the solving of the same. By way of example, if the rider turns the handlebars to the right to try to quickly compensate for the accumulated left turn, and at the same time releases the brake to gain control, the front wheel may turn to the right further than it originally deflected to the left, etc. Consequently, the front wheel spin axis may oscillate in a horizontal plane depending upon the amount of braking, the rider response and the softness of the front fork assembly.

Also, depending upon speed, the front wheel may have a substantial gyroscopic effect. Since the front fork assembly is a spring mounted assembly, vertical motion of the front wheel axis is reasonably unrestrained, so that again, depending upon the rigidity of the front fork assembly, the wheel spin axis may alternately dip to the left and right. The resulting motion of such a rotating body is referred to as nutation, which motion will have a frequency dependent upon the speed of the vehicle, and at certain speeds may be grossly aggravated rather than compensated for by the response time of the rider in controlling the handlebar position. Of course this all occurs at a most inopportune time, as braking is normally done when a need to do so arises, and generally cannot be significantly delayed, such as might be required to regain full control of the motorcycle.

Another condition where the softness of a front fork assembly is particularly evident and disadvantageous is in turning, particularly low speed turns, as one might make in traffic to enter a driveway, etc. Here the forces on the front wheel may vary considerably, dependent on how far the front wheel is turned, how fast the motorcycle is going, whether power or braking is being applied, etc. With the front wheel turned, the wheel is also inclined substantially with respect to the vertical (even with the machine held vertically as when stopped), so that the front wheel is standing on the edge thereof, tending to deflect the fork assembly accordingly. If on the other hand, power is being applied during the turn, the front fork assembly will tend to deflect in an opposite direction, with braking as herein before described affecting the extent of turn of the front wheel. These various factors affect not only the turn of the front wheel, but also the location of the contact of the front wheel with the ground, affecting the balance of the vehicle when the vehicle is not very stable to start with because of the slow speed. Accordingly, a large number of spills and/or near spills occur on the type of motorcycle described during low speed turns, again because of the softness of the front fork assembly of the motorcycles and the various and variable forces thereon caused by various turning conditions.

Further, there is an additional situation which causes instability while driving, namely, the grooving of highways to improve traction between tires and the highway surface particularly in rainy weather. These rain grooves, now quite common, generally are aligned with the direction of vehicle travel down the highway, though only approximately, as the grooves are cut without any real concern in the accuracy of the alignment thereof. Further of course, the vehicle itself will not necessarily be headed straight down the road, whether a motorcycle, car or otherwise, and will generally change positions within a lane and/or change lanes from time to time as traffic conditions suggest. Consequently, since a vehicle's tires will only be approximately aligned with the direction of the rain grooves, depending upon conditions, the rain grooves may react with the vehicle's tires to prevent substantial and time varying side loads thereon. In the case of motorcycles of the type described, these side loads themselves can excite front wheel nutation and cause steering wander which can lead to a single vehicle straight and dry road crash.

A component of prior art front-end fork assemblies is a fork bridge which is adapted to fit between the two prongs of the motorcycle fork above the "slider" unit thereof. However, this prior art fork bridge does not address or recognize the source of the aforementioned problems in that independent flexing of the lower case fork prongs is not prevented.

More specifically, prior art fork bridges have a hollow and thin contour and are typically comprised of cast aluminum, not precision machined, provide minimal contact with the lower case fork prongs and do not serve to partially capture the lower case fork prongs, thereby failing to prevent independent flexing of the lower case fork prongs. Such prior art fork bridges allow the fork prongs to flex and turn independent of one another, which the forks were not designed to do. Since sideload pressure exerted on one or the other fork prong during operation of the motorcycle (i.e. during driving) can, depending on load, speed and degree of curve, braking, torque, etc., reach up to 30,000 pounds per square inch, it will be appreciated that a motorcycle front-end fork assembly must be able to adequately resist twisting forces of great magnitude.

Since the inability of the prior art fork bridge to control the twisting of the forks causes a loss of control during steering and braking, thereby often resulting in a complete loss of control of the motorcycle and resulting injury to the driver, proper stabilization of motorcycles is a critical and unsolved problem.

SUMMARY OF THE INVENTION

It has been discovered that the source of the problem of the afore-described instability of a front end fork assembly is the independent flexing of the bottom case prongs. The present invention properly addresses these problems of independent flexing of the lower case prongs of a motorcycle and is designed to act as a stabilizer for the two prongs of the motorcycle fork.

Accordingly, the afore-described obstacles and drawbacks contained in prior art motorcycle front-end fork assemblies are overcome in a stabilizer, for the front-end fork of a motorcycle the fork stabilizer including a means for resisting twisting forces which act against the front-end fork of a motorcycle when the motorcycle is turning or braking. The means for resisting said twisting forces include an elongate member, comprised of unitary metallic material having a substantially solid cross-sectional area, the elongate member also having curved areas disposed at each end of the elongate member, said curved area being adapted to make a net fit between the prongs of the front-end fork of the motorcycle, whereby the twisting forces are substantially reduced, thereby assuring smooth and continuous operation and steering of said front-end fork.

Since nutation of a rotating body requires an ability of the spin axis of the rotating body to wobble about both axes orthogonal to the spin axis, the rigidity and resistance to such motion provided to the fork assembly by the unique design of the present invention effectively eliminates nutation and maintains the bottom cases parallel to each other, with the net result that the front wheel position very closely and very quickly follows the handlebar position to provide accurate and responsive steering, whether in low speed turns or at higher speeds on a raod with rain grooves, which steering is substantially undisturbed during braking. The net result is that the softness of the front suspension causing instabilities and/or lack of response during turns, braking, or from grooved roads, is effectually eliminated by the present invention.

BRIEF DESCRIPTION OF THE DRAWINGS

In FIG. 13 there is shown a bottom plan view of the embodiment shown in FIG. 10;

In FIGS. 14 and 14A there is shown the embodiment shown in FIG. 10 installed on the front fork of a motorcycle;

In FIG. 15 there is shown a perspective view of a fourth embodiment of the present invention;

In FIG. 19 and 19A there is shown the embodiment shown in FIG. 15 installed on the front fork of a motorcycle.

DETAILED DESCRIPTION OF THE PREFERRED EMBODIMENT

Figure 1:
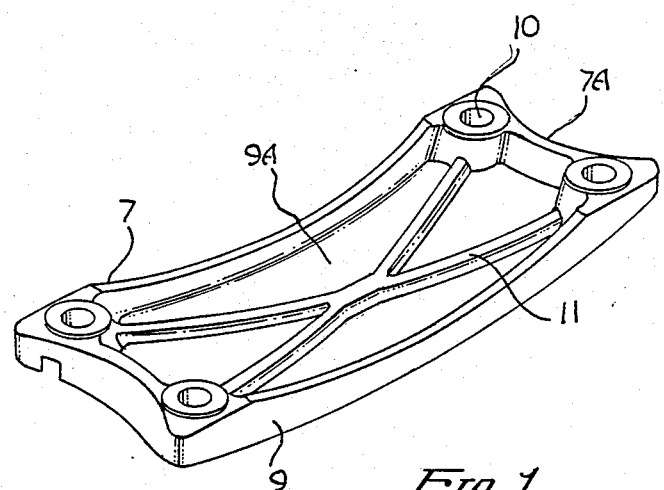
In FIG. 1 there is shown a perspective bottom plan view of a prior art front-end fork bridge for a motorcycle.

In FIG. 1 there is shown a bottom plan view of a prior art fork bridge of the front fork of a motorcycle, generally denoted by reference number 7. The motorcycle fork bridge 7 is installed between the prongs of the front fork of the motorcycle above the slider mechanism and is typically comprised of case aluminum. The prior art motorcycle bridge 7 is also comprised of an exterior casing 9 which, as shown in FIG. 1, is hollow and defines a hollow interior region 9A. Each end of the prior art bridge 7 is inwardly curved in order to mate with the reciprocally curved surface of each prong of the motorcycle fork. However, the curved ends of the prior art fork bridge are not precision machined and do not prevent independent flexing of the bottom case prongs of the motorcycle fork since there is typically a gap between the ends of the prior art bridge and bottom case prongs. Disposed within each corner of the prior art bridge 7 is a bolt hole 10 which is adapted to receive bolts which threadably engage with threaded bores disposed in a seat or bracket portion of the motorcycle fork assembly and which thereby secure the fork bridge 7 between the two prongs of the motorcycle front-end assembly, such that the curved ends 7A are adjacent each prong of the motorcycle fork. However, the bolt holes 10 are each surrounded by a raised boss 10A which provides a very limited mounting surface when the bracket is installed on a motorcycle and therefore does not provide proper rigidity regardless of how tightly the bolts are torqued. Also, since prior art fork bridges are typically comprised of cast aluminum, after installation, the bolt holes 10 often wear and enlarge with time, due to stress which the bridge experiences, caused by the aforementioned conditions present during driving, thereby allowing the fork bridge to move about on the front end and providing minimal or no rigidity. Additionally, as will later be discussed in more detail, the holes 10 are not accurately proportioned to hold the bolt as snugly as possible, thereby also contributing to slippage of the bridge and lack of rigidity.

Disposed within the interior hollow region 9A of the fork bridge 7 is a cross-beam structure 11. However, during operation of the prior art motorcycle bridge 7, it has also been found that the hollow interior casing design which depends upon the cross-beam structure 11 in order to lend stability to the hollow interior region 9A of the bridge 7, is ineffective in preventing twisting and turning of the prongs of the front-end fork of a motorcycle.

Specifically, during operation, the hollow casing tends to flex and twist, when installed, thereby allowing the prongs of a front-end fork of a motorcycle to twist and turn in a non-parallel fashion, thereby causing the afore-mentioned problems of instability and lack of control of the motorcycle while driving. Additionally, the prior art bridge tends to experience stress cracks and fractures within a relatively short period of time.

Also, as indicated, due to the casting and poor machining tolerances of the prior art bridge, the stabilizer is usually, on the average, 0.150 to 0.200 inches short of being a net fit between the curved ends of the bridge 7 and the curved ends of the bridge 7 and the two prongs of the motorcycle fork, which also greatly contributes to a lack of stability in motorcycles using such a prior art bridge.

Figure 4:
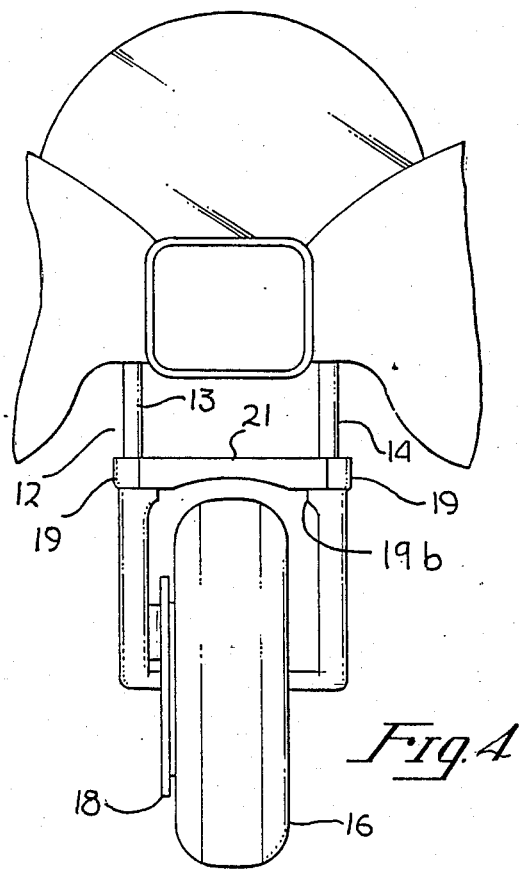
In FIG. 4 there is shown the present invention as installed on the front fork of a motorcycle.
Figure 2:
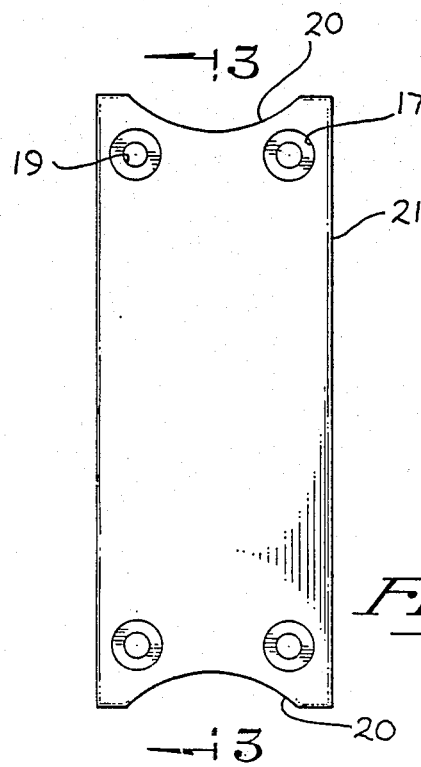
In FIG. 2 there is shown a top plan view of a stabilizer bar for a motorcycle employing the concepts of the present invention.
Figure 3:
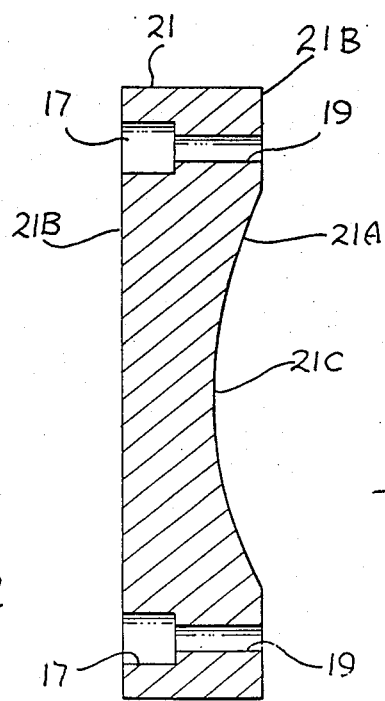
In FIG. 3 there is shown a side cross-sectional view of the motorcycle bar of FIG. 2 taken along lines 3—3.

In FIG. 2 there is shown a top plan view of a fork stabilizer embodying the concepts of the present invention, which is generally denoted by reference number 21. In FIG. 3 there is shown a cross-sectional side view of the invented motorcycle stabilizer of FIG. 2 taken along lines 3-3. In FIG. 4 there is shown the invented motorcycle fork stabilizer 21 installed on the front-end fork of a motorcycle. The foregoing description of the present invention will be made with reference to FIGS. 2-4.

In the preferred embodiment, the stabilizer 21 is comprised of a hot forged 6061 grade aluminum bar which is heat-treated to a T6 condition then precision machined to the dimensions shown in FIG. 2 and 3. The grade and heat treatment of the aluminum lends great strength to the stabilizer 21.

The invented motorcycle stabilizer 21 has inwardly curved transverse areas 20 at each end thereof, as shown in FIG. 2. The curved areas 20 are adapted to mate with and partially capture the inner curved surfaces 19 of the bottom case prongs of the front fork 12, as shown in FIG. 4. The invented fork brace 21 also has substantially coplanar mounting surfaces 21b. Each end of the fork bace provides the greatest possible footprint on the planar upper mounting surfaces 19B, of the bottom case prongs of the front fork assembly, as shown in FIG. 4.

The motorcycle stabilizer 21 also has an inwardly curved longitudinal surface area 21A which, when installed on a motorcycle front-end fork 12, is disposed above the front tire 16 of the motorcycle, as shown in FIG. 4. However, it will be appreciated that the curved region 21A can be eliminated from the construction of the present invention such that a straight edge is present mirroring the straight edge 21B of the topside of the motorcycle stabilizer 21. Bolt recesses 17 are disposed within the motorcycle stabilizer 21 at each corner thereof and have a restricted bore portion 19 which, together with recessed portion 17, are machined to retain a bolt snugly therewithin. In contrast, due to poor tolerances of the prior art motorcycle bridge 7 of FIG. 1, the bolt holes 10 thereof are typically 0.047 inches larger than the bolts that are used to attach the stabilizer 7 to the front-end fork of a motorcycle, thereby adding to the poor stabilizing characteristics thereof.

The stabilizer 21 of the present invention is not produced by casting, but rather is precision machined to the desired dimensions from a solid bar of hot forged aluminum, such that the transverse curved areas 20 make a net fit between the fork prongs 13 and 14 of the motorcycle front-end 12 of FIG. 4. Also, the bolt recesses and bores 17 and 19 are more closely machined to provide a more snug fit with the bolts disposed therewithin.

Moreover, the invented stabilizer 21 is not constructed in a hollow fashion, but is rather a solid cross-section 21C which also greatly contributes to the stability of the motor cycle fork assembly 12 as compared to the prior art fork bridge 7 of FIG. 1.

It will therefore be appreciated that the invented stabilizer 21 greatly resists twisting and turning forces that the fork experiences while the motorcycle is being driven during braking and turning, thereby preventing the prongs 13 and 14 of the motorcycle fork assembly 12 from twisting out of alignment from one another in a non-parallel fashion, thereby also greatly enhancing the smooth operation and control that a driver exerts over the steering of the motorcycle while driving.

Figure 5:
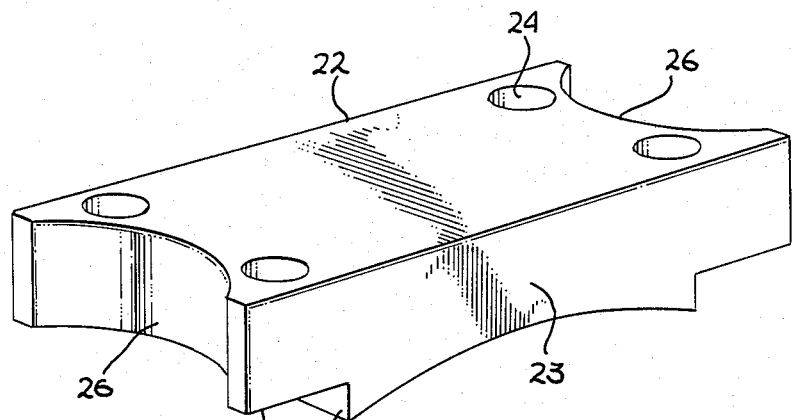
In FIG. 5 there is shown a perspective view of the second embodiment of the present invention.
Figure 6:
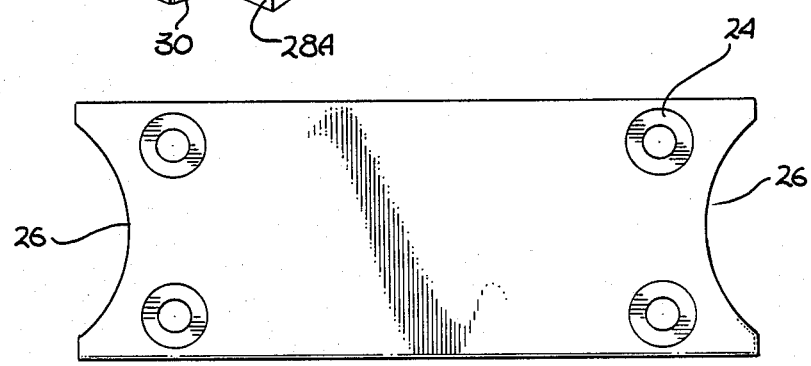
In FIG. 6 there is shown a top plan view of the embodiment shown in FIG. 5.
Figure 7:
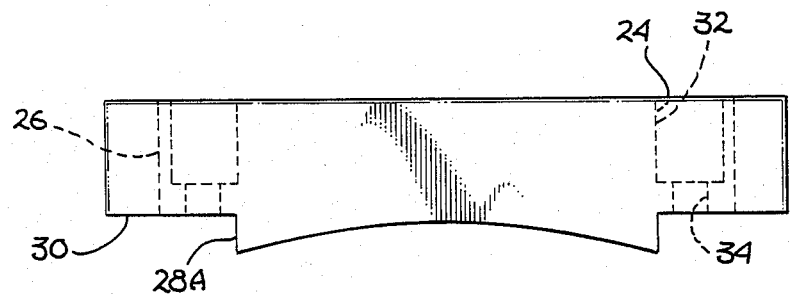
In FIG. 7 there is shown a front view of the embodiment shown in FIG. 5.
Figure 8:
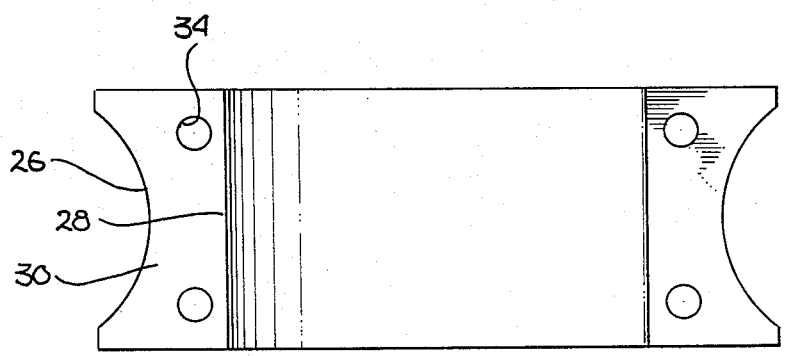
In FIG. 8 there is shown a bottom plan view of the embodiment shown in FIG. 5.

Turning now to FIG. 5, there is shown a perspective view of a fork brace embodying the concepts of the present invention in an alternative embodiment. In FIG. 6, there is shown a top plan view of the embodiment shown in FIG. 5. In FIG. 7 there is shown a front view thereof. In FIG. 8 there is shown a bottom plane view thereof and in FIG. 9 there is shown a front view of the embodiment shown in FIG. 5 installed on the bottom case prongs of the front fork assembly of a motorcycle.

Figure 9:
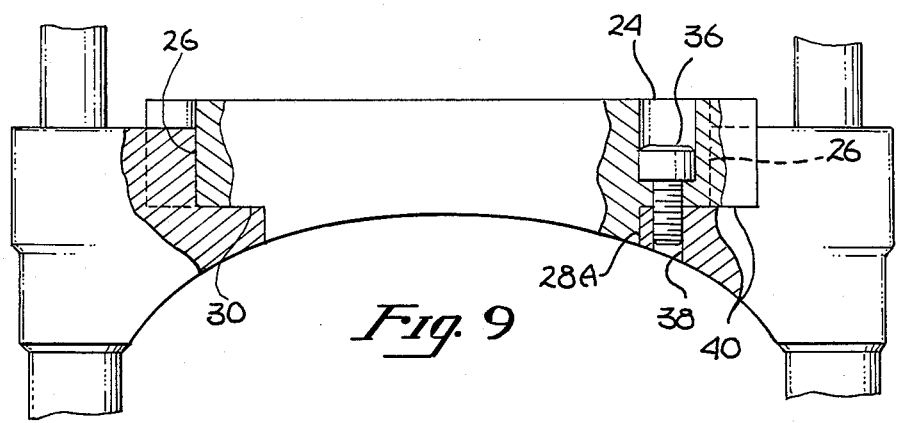
In FIG. 9 there is shown a partial cross-sectional view of the embodiment shown in FIG. 5 installed on the front-end fork of a motorcycle.

The second embodiment of the present invention will be described in reference to FIGS. 5, 6, 7 8 and 9. As with the first embodiment of the invented fork brace shown in FIG. 3, the second embodiment of the present invention shown in FIG. 5, has bolt holes 24, having a recessed portion 32 and 2 restricted portion 34, which are precision machined to maintain a bolt as snugly as possible there within. The second embodiment of the present invention also has generally curved areas 26 disposed at each end of the fork stabilizer 22. Curved ends 26 serve to partially capture the lower case prongs of the front fork assembly, and are precision machined to make a net fit there between, the curved ends 26 partially encircle the bottom prongs in a substantially cylindrical arc, not more than 180°. The fork brace 22 also has substantially coplanar upper mounting surfaces 30 disposed at each end of the fork brace on the bottom side thereof which, when installed, will be adjacent the mating coplanar mounting surface of the bracket of the bottom case fork prong thereby providing a maximum of surface area for mounting the fork brace thereon, which also contributed to the prevention of independent flexing of the bottom case fork prongs. Partial capturing the lower case fork prongs of the bottom case fork prongs of the circumferentially curved areas 26 of the fork brace of FIG. 5 is shown in FIG. 9, wherein there is shown a partial cross-sectional view of the installed brace 22. As may be seen from FIG. 9, a bolt 36 snugly fits within recessed portion 32 and restricted portion 34. The bolt 36 is threadably engaged with a threaded bore 38 of the mounting bracket 40 of the bottom case prongs. Additionally, a downwardly extending substantially coplanar mounting surface 28A is precision machined to afford a maximum footprint against the mating substantially coplanar surface 40 of the bottom case prong. The ridge portion 28A is precision machined to mate flush with reciprocal surface 40 of the bottom case prongs. Surface 28A is perpendicular to surface 30 of the brace 22, so that together, coplanar mounting surface 30 and downwardly extending surface 28A greatly combine to resist twisting forces which are present in the bottom case prongs during driving. As such, it will be appreciated that the accurately proportioned curved areas 26 which partially capture the lower case fork prongs, the snug fitting bolt holes having an absence of bolt bosses, together with the coplanar mounting surfaces 28A and 30, as well as a substantially solid cross-sectional area 23 provide rigidity which greatly reduces or eliminates independent flexing of the bottom case fork prongs, thereby resulting in far superior control and response during driving than is present in prior art front-end fork assemblies.

Figure 10:
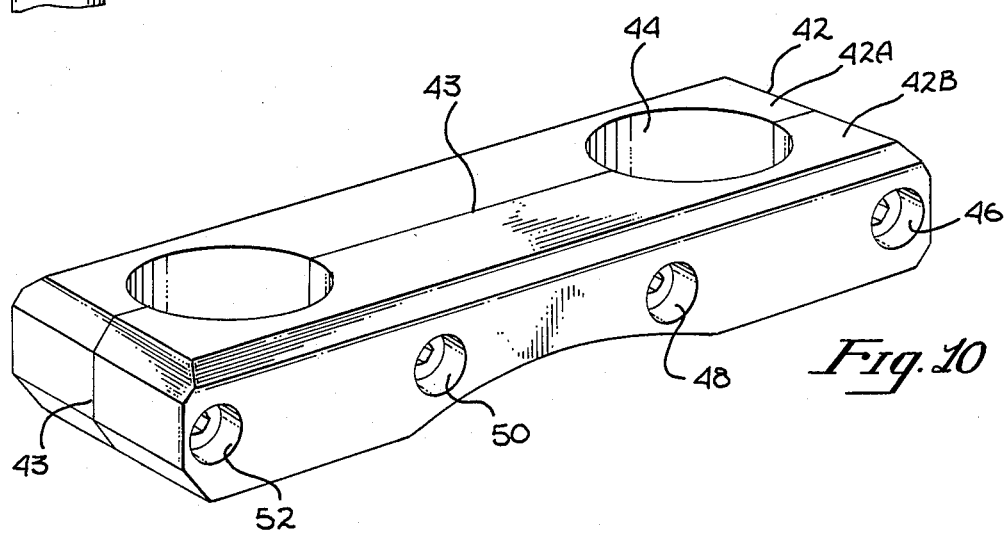
In FIG. 10 there is shown a perspective view of a third embodiment of the present invention.
Figure 11:
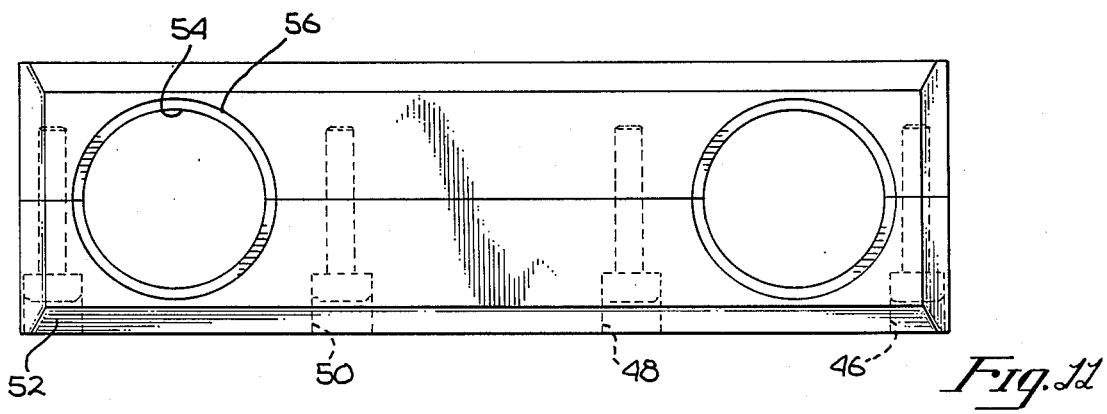
In FIG. 11 there is shown a top plan view of the embodiment shown in FIG. 10.
Figure 12:
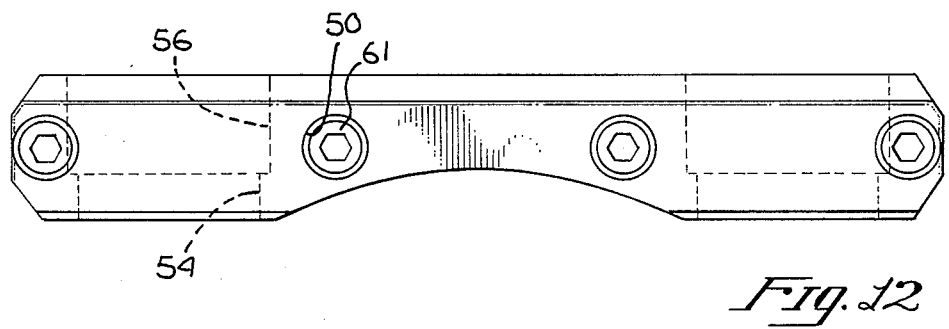
In FIG. 12 there is shown a front view of the embodiment shown in FIG. 10.

Turning now to FIG. 10, there is shown a third embodiment of the invented fork brace, incorporating the concepts of the present invention. The embodiment shown in FIG. 10 will be discussed with reference to FIGS. 11 (a top planar view thereof), FIG. 12, (showing a front view thereof), and FIG. 13, (showing a bottom plane view thereof), as a well as FIG. 14, (showing a partial cross sectional view of the installed fork brace of the third embodiment). The fork brace of the third embodiment is generally denoted by reference numeral 42 and is comprised of two mating components 42A and 42B. The mating surfaces of components 42A and 42B are precision machined to mate continuously along location 43, such that when bolted, the halves 42A and 42B mate so closely together that they function as an integral unit. Beginning at portion 42B and extending into portion 42A are are bolt holes 46, 48, 50 and 52, each have a recessed portion 60 and a threaded bore portion 56, which threadably engages with a bolt 61, as shown in FIG. 11. Disposed proximately to each end of the fork brace 42 are mounting apertures 44, which are also precision machined to make maximum contact with the bottom case fork prongs of various models of motorcycles. Fork brace 42 is designed to stabilize lower case fork prongs which do not have supporting brackets. As shown in FIGS. 11, 12 and 14, the apertures 44 have two portions, an outer peripheral portion 56 and an inner peripheral portion 54. The outer peripheral portion 56 is smaller than the inner peripheral portion 54. Portions 56 and 54 are precision machined to make the closest possible contact to reciprocal portions 64a and 64b of bottom case prongs 64, by providing maximum contact surface with the bottom case prongs, thereby providing maximum rigidity thereto, as shown in FIG. 14. The diameters of portions 56 and 54 are accurately proportioned to mate as closely as possible to reciprocal surfaces 64a and 64b of the bottom case prongs without denting or crimping the same. As such, independent flexing of the bottom case prongs 64 is effectually eliminated. As stated, due to the size of the bolt holes and the precision machining of components 42a and 42b, when bolted together parts 42A and 42B operate as an integral unit, thereby providing maximum rigidity to the bottom case prongs of the front end of a fork assembly. It is important to note that the front case fork prong 64 does not have a narrower portion 64b, then the outer peripheral portion 56 extends throughout aperture 44, as shown in FIG. 14A, in order to provide a maximum mounting surface area and make the greatest possible contact with the bottom case prong.

Figure 16:
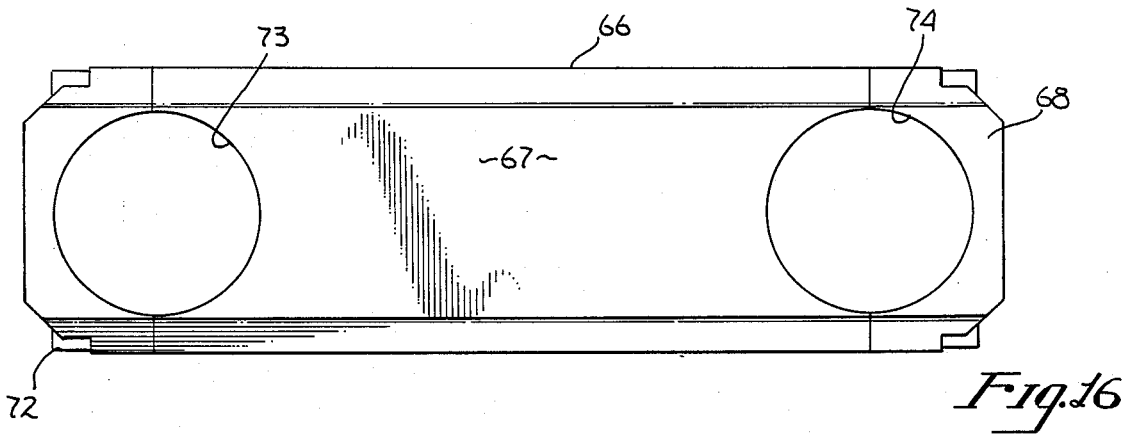
In FIG. 16 there is shown a top plan view of the embodiment shown in FIG. 15.
Figure 17:
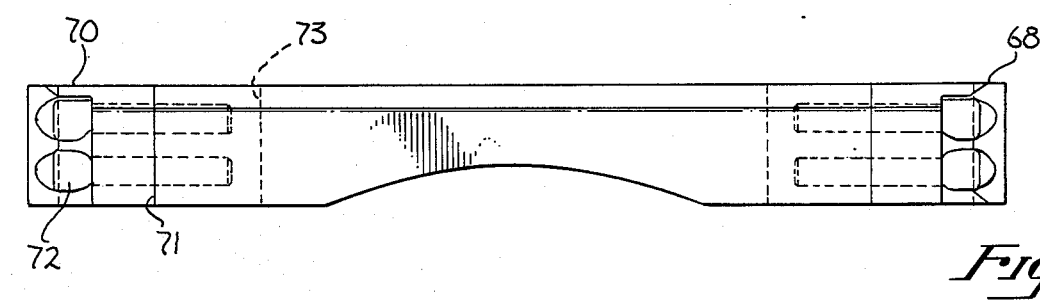
In FIG. 17 there is shown a front view of the embodiment shown in FIG. 15.
Figure 18:
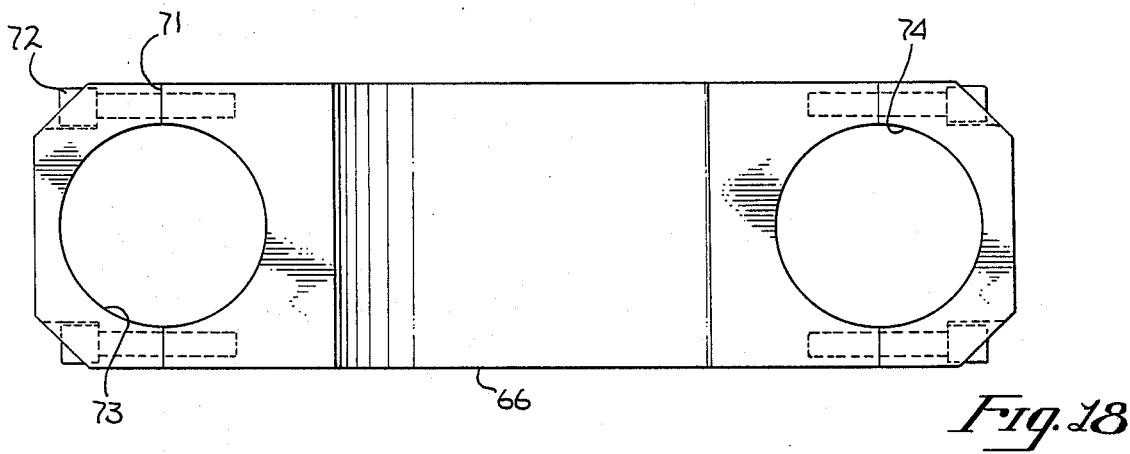
In FIG. 18 there is shown a bottom plan view of the embodiment shown in FIG. 15.
Figure 19A:
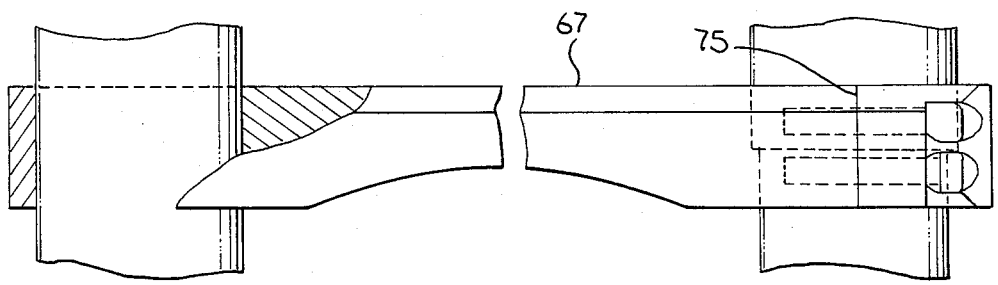

Turning now to FIG. 15 there is shown a perspective view of the fourth embodiment of the present invention, which is also designed for bottom case fork prongs which do not have brackets. FIG. 16 shows a top plane view of the embodiment shown in FIG. 15, FIG. 17 shows a front view thereof, FIG. 18 shows a bottom plane view thereof while FIGS. 19 and 19A show the embodiment shown in FIG. 15 installed on the bottom case prongs of the motorcycle. FIG. 15 shows a fork brace generally denoted by reference numeral 66, comprised of three parts. The description of the fourth embodiment of the present invention will be described with reference to FIGS. 15, 16, 17, 18 and 19. The fork brace 66 has mounting apertures 74 and 73, which are precision machined to tightly capture, without crimping or denting the bottom case prongs of the front end fork assembly and provide maximum surface area contact there against. The fork brace 66 is comprised of three parts, center piece elongate member 67, and end pieces 68 and 70. End pieces 68 and 70 are mirror images of one another, and are joined to opposite ends of centerpiece 67, respectively, at locations 71 and 95 thereof. The mating surfaces of the centerpiece 67 at locations 75 and 71 are precision machined to mate continuously flush with, respectively, reciprocal end portions 70 and 68, as shown in FIG. 15. The same is exactly true with respect to the mating surfaces of end pieces 70 and 68, at, respectively, locations 71 and 75, such that when the components 67, 70 and 68 are bolted with bolts 72, the parts mate so flushly together that they operate as a single integral unit, thereby eliminating movement between the component parts in order to provide maximum rigidity to fork brace 66. As may be seen from FIG. 17, 18 and 19 bolt holes 79 are precision machined to snugly maintain the bolts there within. Portion 79A is threadably engaged with bolt 80. In a preferred embodiment of the present invention, eight bolts are used in order to couple end pieces 70 and 68 to centerpiece 67 so that no movement occurs between end pieces 68 and 70 with respect to centerpiece 67, such that, between the number and strength of the bolts, as well as the optimally flush mating surfaces of end pieces 68 and 70 and center piece 67, the fork brace 66 may operate as an integral unit. It will be appreciated that less than eight bolts may be used. FIG. 17 shows a partial breakaway view of the invented fork brace 66. As with fork brace 42, the apertures 73 are accurately proportioned to mate with the dimension of the bottom case prongs of a front end assembly, upon which the fork brace is to be installed, in order to provide maximum and tight contact surface there against. As such, maximum rigidity of the bottom case prongs is provided and independent flexing of the forks is greatly reduced or eliminated. When the bottom case prong has an expanded portion 82A and a restricted portion 82B, as shown in FIG. 19A, then the aperture 74 has a reciprocally dimensioned outer peripheral portion and an inner peripheral portion as in FIG. 14.

It will also be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

I claim:

1. A fork stabilizer for the front-end fork assembly of a motorcycle of the type having brackets connected adjacent to the upper ends of the bottom case prongs of the fork assembly, each bracket having a substantially flat upper face substantially parallel to the corresponding upper face of the other bracket and substantially a flat transverse face substantially parallel to the corresponding transverse face of the other bracket, said transverse face extending at an angle of approximately 90° relative to said substantially flat upper face; each bracket also having two bracket mounting holes through each upper face thereof collectively arranged in a predetermined pattern, said fork stabilizer comprising;

an elongate member comprised of unitary metallic material having a substantially solid cross-sectional area, said elongate member having first and second substantially coplanar mounting surfaces adjacent each end thereof, each mounting surface for positioning flat against said upper faces of said fork brackets, said elongate member having a pair of stabilizer mounting holes therethrough adjacent each end thereof and passing through a respective mounting surface, said elongate member also having third and fourth substantially coplanar mounting surfaces, said third and fourth surfaces extending at an angle of approximately 90° relative to said first and second mounting surfaces, respectively, said stabilizer mounting holes being arranged in said predetermined pattern and having a diameter to provide a snug fit with mounting bolts for passing therethrough into the brackets of the fork assembly, said elongate member having first and second ends accurately proportioned and spaced to fit closely between and partially capture the upper ends of the bottom case prongs of the front-end fork assembly of the motorcycle, whereby the bottom case prongs are maintained substantially parallel during braking, turning and other disturbing influences by the rigidity of the fork stabilizer in torsion, the entrapment of the upper ends of the prongs of the bottom cases by the fork stabilizer, the resistance to independent flexing of the bottom case prongs provided by the first, second, third and fourth mounting surfaces, and by the fastening of the fork stabilizer to the brackets with bolts which prevent slippage with respect thereto to prevent the upper ends of the bottom case prongs from at least partially slipping out of the fork stabilizer ends.

2. A fork stabilizer acording to claim 1 herein said elongate member is substantially comprised of 6061 hot forged aluminum.

3. The fork stabilizer according to claim 2 wherein said aluminum is heat treated to a T6 condition.

4. A fork stabilizer for the front-end fork assembly of a motorcycle of the type having bottom case prongs having a substantially circular outer circumference, each bottom case prong extending from the front wheel of the motorcycle substantially parallel to one another, said fork stabilizer comprising;

an elongate comprised of unitary metallic material having a substantially solid cross-sectional area, said elongate member having first and second substantially planar surfaces, said first and second substantially planar surfaces being disposed transverse to the longitudinal axis of said elongate member, at each end thereof, said planar surfaces having mounting holes disposed in a predetermined pattern, said elongate member having first and second ends accurately proportioned and spaced to fit closely between and partially capture the upper ends of the bottom case prongs of the front-end fork assembly of the motorcycle, said fork stabilizer further comprising two end members, each said end member having a second and third substantially planar mounting surfaces for mounting flat against said first and second planar surface of said elongate member, said end members having bolt holes arranged in said predetermined pattern for receiving bolts for mounting said end pieces to said first and substantially second planar surfaces, each said end member having an inner portion accurately proportioned to partially capture said bottom case prong and mate with said accurately proportioned end of said elongate member to tightly encircle the circular outer circumference of said bottom case prongs;

whereby the bottom case prongs are maintained substantially parallel during breaking, turning and other disturbing influences by, the rigidity of the fork stabilizer in torsion provided by the flat mating of said first and second planar surfaces of the elongate member with the second and third planar surfaces of each end member, and the encirclement of the outer circumference of the bottom case prongs when the end members are mounted against a respective planar surface of said elongate member.

5. A fork stabilizer according to claim 4 herein said elongate member is substantially comprised of 6061 hot forged aluminum.

6. The fork stabilizer according to claim 5 wherein said aluminum is heat treated to a T6 condition.

7. A fork stabilizer for the front-end fork assembly of a motorcycle of the type having brackets connected adjacent to the upper ends of the bottom case prongs of the fork assembly, each bracket having a substantially flat upper face substantially parallel to the corresponding upper face of the other bracket and a substantially a flat transverse face substantially parallel to the corresponding transverse face of the other bracket, each bracket also having bracket mounting holes through each upper face thereof collectively arranged in a predetermined pattern, said fork stabilizer comprising;

an elongate member comprised of unitary metallic material having a substantially solid cross-sectional area, said elongate member having first and second substantially coplanar mounting surfaces adjacent each end thereof, each mounting surface being accurately proportioned for positioning flat against said upper faces of said fork brackets, said elongate member having stabilizer mounting holes therethrough adjacent each end thereof and passing through a respective mounting surface, said elongate member also having third and fourth substantially coplanar mounting surfaces, said third and fourth surfaces extending at a substantial angle relative to said first and second mounting surfaces, respectively, said third and fourth surfaces being accurately proportioned for positioning flat against said transverse faces of said brackets, said stabilizer mounting holes being arranged in said predetermined pattern and having a diameter to provide a snug fit with mounting bolts for passing therethrough into the brackets of the fork assembly, whereby the bottom case prongs are maintained substantially parallel during braking, turning and other disturbing influences by the substantially solid cross section of said elongate member and resulting rigidity of the fork stabilizer in torsion, th resistance to independent flexing of the bottom case prongs provided by the first, second, third and fourth mounting surfaces, and by the fastening of the fork stabilizer to the brackets with bolts which prevent slippage with respect thereto to prevent the upper ends of the bottom case prongs from at least partially slipping out of the fork stabilizer ends.

8. A fork stabilizer for the front-end fork assembly of a motorcycle of the type having bottom case prongs having a substantially circular outer circumference, each bottom case prong extending from the front wheel of the motorcycle substantially parallel to one another, said fork stabilizer comprising;

a pair of elongate members comprised of unitary metallic material having a substantially solid cross-sectional area, each said elongate member having first and second substantially planar surfaces, said first and second substantially planar surfaces being disposed longitudinally on one side of said elongate member for mating flat against one another, said elongate members having mounting holes disposed in a predetermined pattern for permitting the mating of one of said elongate members to the other one of said elongate members at said first and second planar surfaces, each said elongate member having first and second portions disposed adjacent each end of said elongate member and being accurately proportioned and spaced to fit closely between and partially capture the upper ends of the bottom case prongs of the front-end fork assembly of the motorcycle, each said first and second portions of each said elongate member being arranged to closely mate with the corresponding first and second portions of the other elongate member to tightly encircle the circular outer circumference of said bottom case prongs;

whereby the bottom case prongs are maintained substantially parallel during braking, turning and other disturbing influences by, the rigidity of the fork stabilizer in torsion provided by the flat mating of said first and second planar surfaces of each elongate member and the encirclement of the outer circumference of the bottom case prongs by the first and second portions of each elongate when said members are mounted against one another at the first and second planar surfaces.

9. A fork stabilizer according to claim 8 wherein said elongate member is substantially comprised of 6061 hot forged aluminum.

10. The fork stabilizer according to claim 9 wherein said aluminum is heat treated to a T6 condition.

* * * * *